United States Patent [19]
Grossman et al.

[11] Patent Number: 5,955,702
[45] Date of Patent: Sep. 21, 1999

[54] ELECTRICAL SWITCH PROTECTIVE COVER

[76] Inventors: M. Gary Grossman, 25 Willowmere Ave., Riverside, Conn. 06878; Edward H. Meisner, 21 Elsway Rd., Short Hills, N.J. 07078; Michael P. Ballone, 51 Holmes Oval N., New Providence, N.J. 07974; John E. Kiely, 5 Valleyview St., Morristown, N.J. 07960

[21] Appl. No.: 08/956,581

[22] Filed: Oct. 23, 1997

[51] Int. Cl.⁶ .................................................. H02G 3/14
[52] U.S. Cl. ............................ 174/66; 220/242; D13/177
[58] Field of Search .......................... 174/55, 53, 17 CT, 174/56, 66, 67; 220/241, 242, 3.8; 200/43.19, 43.22, 43.16, 43.11; D8/353; D13/177

[56] References Cited

U.S. PATENT DOCUMENTS

| | | | |
|---|---|---|---|
| 2,813,938 | 11/1957 | Speizman | 200/43.21 |
| 4,363,944 | 12/1982 | Poirier | 200/43.19 |
| 4,707,564 | 11/1987 | Gonzales | 174/66 |
| 5,675,125 | 10/1997 | Hollinger | 174/66 |
| 5,693,911 | 12/1997 | Sydow | 174/66 |
| 5,723,832 | 3/1998 | Hall | 200/43.16 |
| 5,837,932 | 11/1998 | Carswell et al. | 174/66 |
| 5,837,937 | 11/1998 | Reese et al. | 174/66 |

OTHER PUBLICATIONS

Paper Cover for Face Plate 174–66 Distributed to Patient Office Employees on Sep. 20, 1973.

*Primary Examiner*—Kristine Kincaid
*Assistant Examiner*—Dhiru R Patel
*Attorney, Agent, or Firm*—Niro, Scavone, Haller & Niro

[57] ABSTRACT

A protective cover for light switches of the type used to control security lights, in particular exterior security lights. The protective cover including a stationary frame adapted to be secured to a wall mounted security light switch cover having a centrally located stationary frame aperture for receiving the light switch toggle therethrough. A movable frame is hingedly attached to the stationary frame and includes a centrally located movable frame aperture for receiving said switch toggle therethrough when said movable frame is hinged closed. A centrally located toggle cover covers the light switch toggle when the movable frame is in its protective closed position, thereby guarding against an individual inadvertently switching the switch toggle.

6 Claims, 4 Drawing Sheets

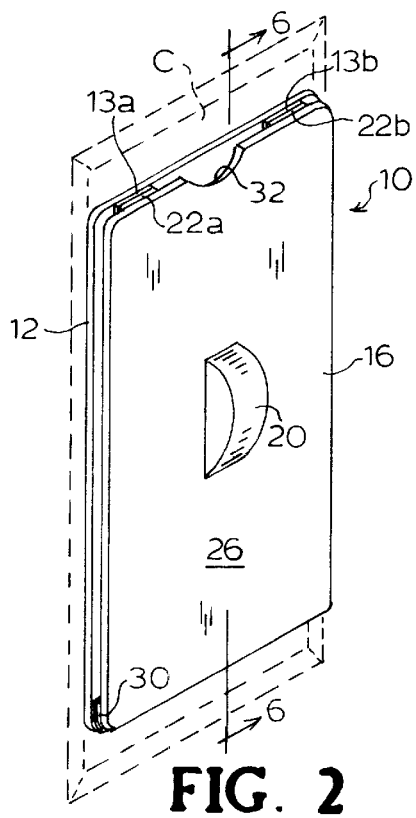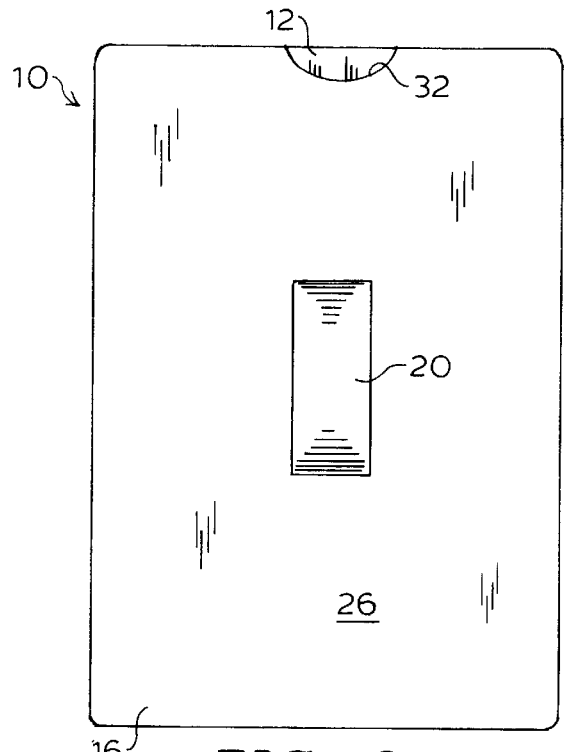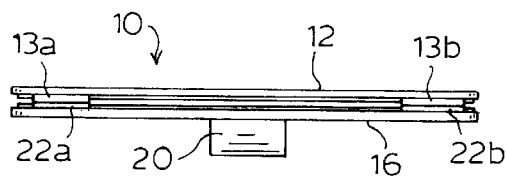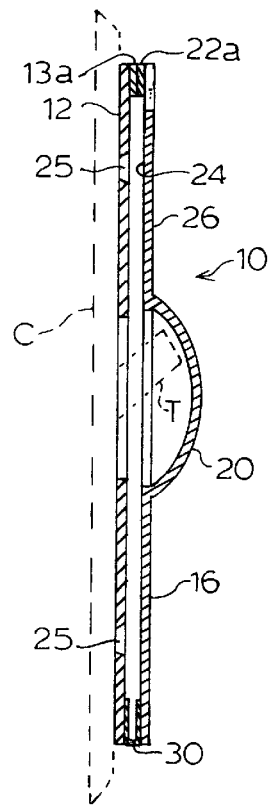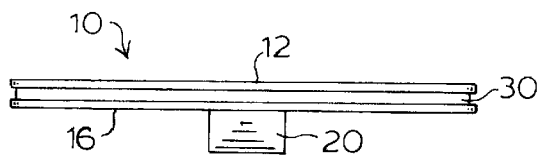

ELECTRICAL SWITCH PROTECTIVE COVER

BACKGROUND OF THE INVENTION

1. Field of the Invention

This invention relates generally to a light switch protective cover, and more specifically to a toggle cover for a switch for control of security lights and the like.

2. Description of the Related Art

Security lights are used extensively in residences and commercial establishments to automatically illuminate a detected stimulus inside or outside the home or other structures. Exterior security lights are the most common security lights. Exterior security lights are electrically connected to switches located inside the home of other structures. Electrical power is supplied to the security lights through the switches. Light switches for security lights are normally mounted on an interior wall by itself or along with numerous other switches which typically operate inside lights and electrical appliances. The typical wall mounted security light switch often looks identical to the typical wall mounted switches that operate interior lights and appliances.

Traditionally, individuals that operate a security light must continue to remember, without the help of external cues, the exact location of the security light switch or switches. However, because individuals are not often thinking of the security light or can't immediately remember its location, they will inadvertently switch the security light switch instead of an intended light or appliance switch thereby canceling the security light's previously selected setting and, in many instances, unknowingly deactivating the security light system altogether. Since the security light is typically mounted on the outside of the building, the effect of changing the security light setting, including the unintentional deactivation of the security light system, will often go unnoticed which results in exposing the establishment to risks for which the security light was installed. Similarly, someone not familiar with the establishments's switch arrangement would not know which switch corresponds to the security light switch and which switches correspond to interior lights and appliances, and therefore may also inadvertently change the security light setting or deactivate the security light.

Many security light systems use the same on/off switch to select specific security light settings. Each setting is selected by switching the toggle switch according to a predetermined time schedule. For example, to put a security light in the "test-mode" (the security light system functions during day or night to test range and allow user to aim lights to desired position), the security light switch is placed in its on position during initial set-up. However, an individual can select the "dusk to dawn" setting by switching, for example, the toggle switch off for 5 seconds and them back on. In the "dusk to dawn" setting, the security light stays in the on position during the night, and turns itself off at dawn. To select, for example, the auto-mode setting, the switch circuit may require a user to toggle the switch off for 30 seconds, then back on. In the "auto-mode setting," the previous setting is canceled and the security light will only detect motion at night.

The number of light setting modes available depends on the security needs and, obviously, the switch-light circuitry developed for those needs. It has been found that security light systems with multiple settings can be ineffective, because individuals do not remember how to activate particular switch settings, and often lose the system's written instructions soon after installation (or if a contractor is involved, may never receive the written instructions) which often results in individuals using their security light systems incorrectly or, in frustration, not at all. Traditionally, there has been no effective mechanism to provide instructions on an ongoing basis to an individual on how to operate the security light switch. Furthermore, there has been no effective mechanism to prevent the inadvertent toggling of a security light switch.

It is therefore the object of this invention to provide a security light switch toggle cover that will guard against inadvertent switching of the security light switch toggle.

It is also an object of this invention to provide instant access to security light switch instructions so that users can effectively and correctly use the security light system.

A further object is to produce a security light switch toggle cover that does not extend significantly beyond the switch toggle so as to avoid snagging passerbys.

It is another object of this invention to provide a quick, safe and easy to use security light switch toggle cover.

SUMMARY OF THE INVENTION

In the preferred embodiment, the security light switch toggle cover of the invention comprises a stationary frame secured to a wall mounted security light switch cover having a centrally located stationary frame aperture for receiving the light switch toggle therethrough. A movable frame is hingedly attached to the stationary frame and includes a centrally located stationary frame aperture for receiving the switch toggle therethrough when the movable frame is closed. A centrally located toggle cover extends over the stationary frame aperture covering the light switch toggle when the movable frame is in its protective closed position, thereby preventing an individual from inadvertently switching the switch toggle.

The toggle cover also includes a set of security light switch instructions located on the outward facing surface of the stationary frame such that when the movable frame is in its open position an individual can read the switch instructions for proper operation.

BRIEF DESCRIPTION OF THE DRAWINGS

FIG. 2 is a perspective view of the protective cover of the invention mounted on a conventional wall light switch and in a closed position;

FIG. 3 is a front view of the protective cover in its closed position;

FIG. 4 is a top view of the protective cover in its closed position;

FIG. 5 is a bottom view of the protective cover in its closed position;

FIG. 6 is a sectional side view of the protective cover in its closed position and showing the toggle cover protecting the toggle of a conventional light switch;

DETAILED DESCRIPTION OF THE INVENTION AND PREFERRED EMBODIMENTS THEREOF

Figure 1:
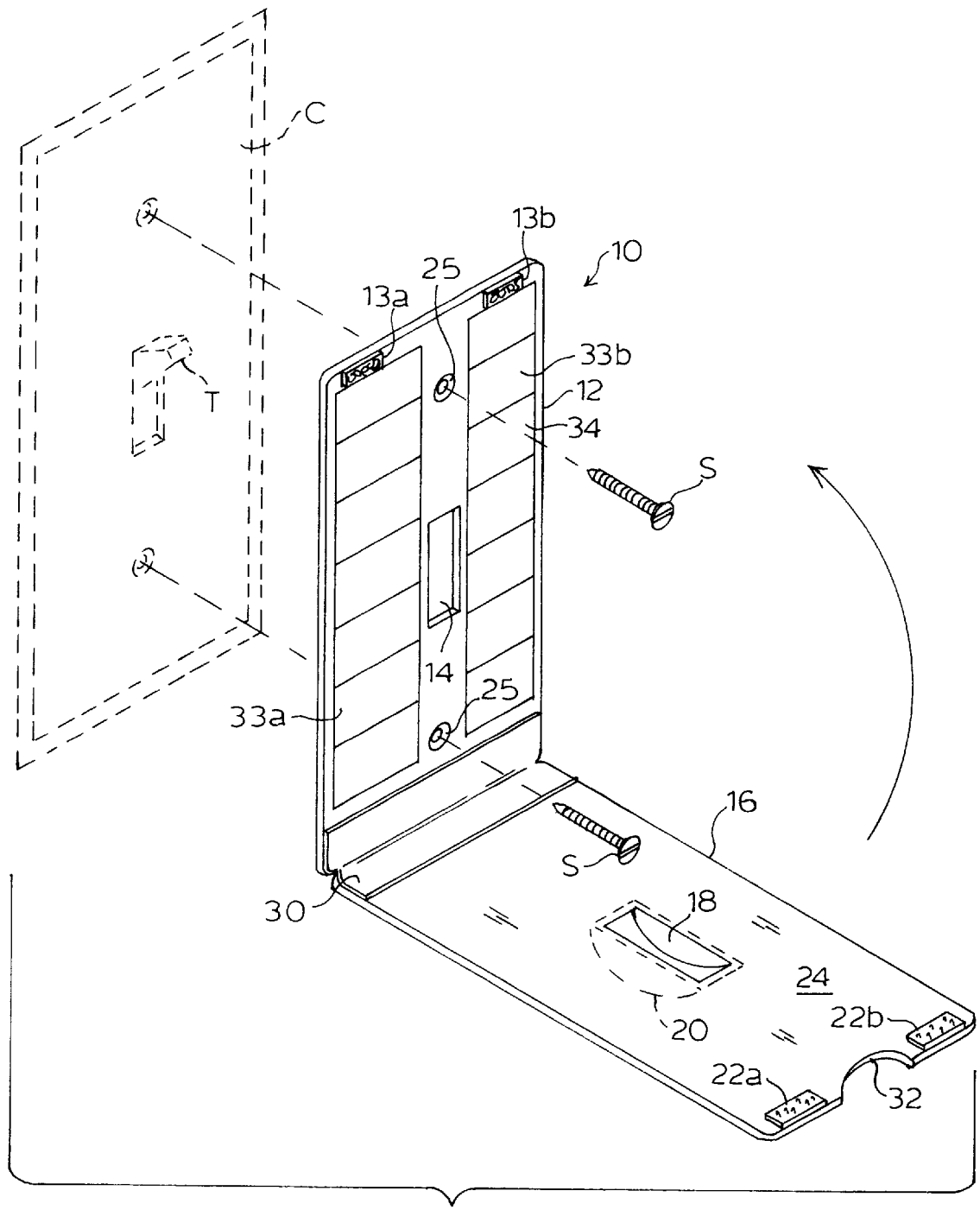
FIG. 1 is an exploded view of the protective cover of the invention positioned opposite a conventional light switch cover with toggle, shown in dotted lines.

FIG. 1 shows an exploded view of the preferred embodiment of the security light protective cover 10, (hereinafter referred to as "protective cover") in combination with a conventional wall mounted light switch cover C, and toggle T. Light switch cover C is attached to a junction box (junction box and electrical wires are not shown) which electrically interconnects the security light to a power source (not shown). Protective cover 10 comprises a stationary frame 12 secured to switch cover C and forms a centrally located stationary frame aperture 14. Aperture 14, when protective cover 10 is attached to switch cover C, receives toggle T therethrough such that toggle T may be toggled. Coupling pads 13a, 13b, comprising a Velcro hook-nap type material, are fixedly attached to the top corners of the outwardly facing surface 27 of stationary frame 12. A pair of screw receiving apertures 25 are located in vertical alignment with screw receiving apertures of switch cover C. Screws S are used to secure protective cover 10 to switch cover C.

Referring now to FIGS. 1, 2, and 3, movable frame 16 having an inside surface 24 and an outside surface 26 is hingedly attached to stationary frame 12 along one of its edges and an adjacent edge of stationary frame 12 by an elongate flexible hinge 30, as best seen in FIGS. 1 and 6. In the preferred embodiment, hinge 30 is made from a cloth or flexible plastic material. It is understood that hinge 30 may be replaced by any other such hinge device well known in the market, such as miniature metal, plastic hinges or spring biasing hinges. Additionally, a semicircular finger hold 32 is located at the top of movable frame 16 between pads 22a, 22b (comprising Velcro hook-nap type material).

Movable frame 16 forms a centrally located movable frame aperture 18 in movable alignment with aperture 14. As best seen in FIGS. 2 and 6, movable frame 16 includes a centrally located semicircular toggle cover 20 extending outwardly from outside surface 26. Coupling pads 22a, 22b are fixedly attached to the inside surface 24 at the top corners of movable frame 16 such that when movable frame 16 is in its closed position, coupling pads 13a, 13b releasably attach to coupling pads 22a, 22b, respectively, thereby closing movable frame 16 to stationary frame 12 such that toggle cover 20 covers toggle T. Coupling pads 13a, 13b, 22a, and 22b may be made from Velcro hook-nap type strips or magnet-type clasps or any other such well known releasable clasp devices.

When movable frame 16 is in its closed position, switch cover 20 surrounds toggle T such that an individual cannot switch toggle T without having to first hinge open movable frame 16, thus, guarding against an individual inadvertently switching the toggle and canceling a previously selected security setting.

FIGS. 4, 5, and 6 show how protective cover 10 presents a relatively short side projection that does not extend significantly from the wall (not shown) upon which it and the switch cover C are mounted. This configuration minimizes the chance an individual might inadvertently snag the toggle cover when walking by.

Figure 7:
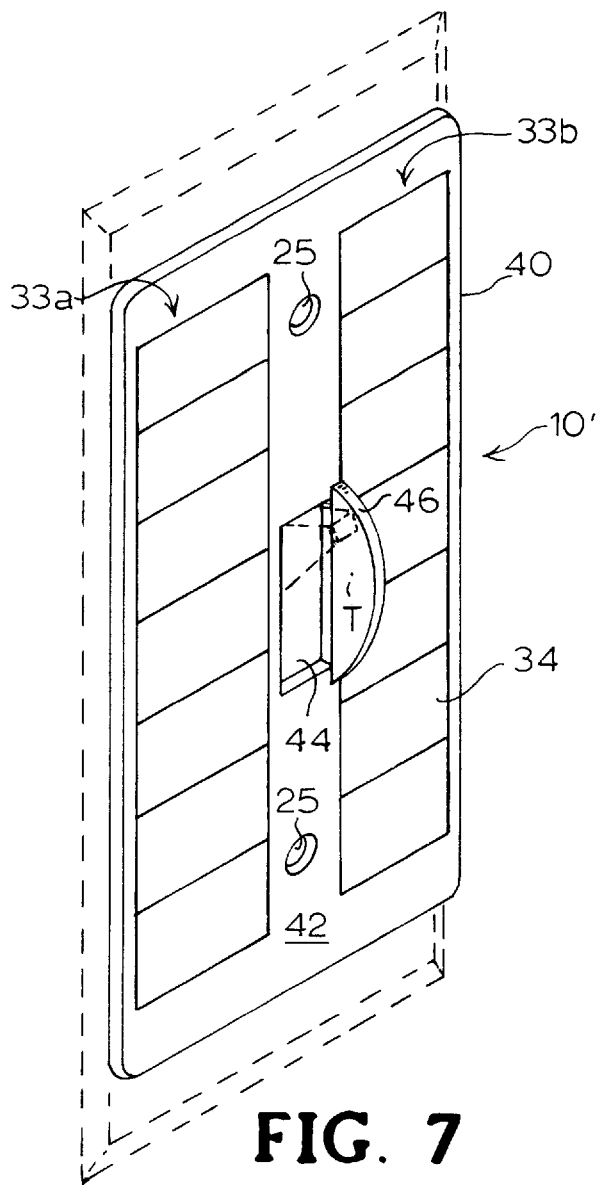
FIG. 7 is a perspective view of a second embodiment of the protective cover of the invention.
Figure 9:
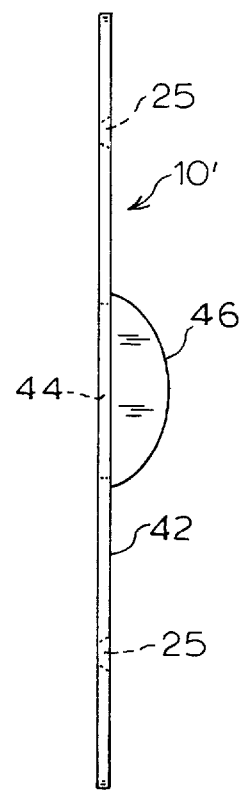
FIG. 9 is a side view of the FIG. 7 protective cover.
Figure 8:
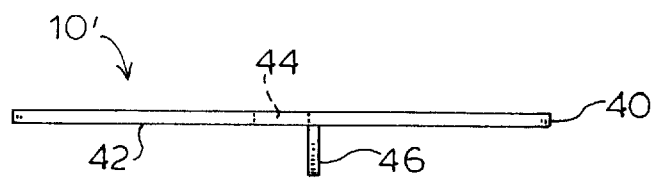
FIG. 8 is a top view of the FIG. 7 protective cover.

FIGS. 7, 8, and 9 illustrate a second embodiment of the present invention. FIG. 7 shows stationary frame 40 having an outwardly facing surface 42 forming a stationary aperture 44 for receiving switch toggle T. Protective plate 46 extends perpendicularly from outwardly facing surface adjacent toggle T. Protective plate 46 does not substantially surround toggle as does the first embodiment of the present invention, but functions to physically and visually remind an individual that adjacent toggle T is not electrically connected to the typical indoor light or appliance, but to a security light. As with the first embodiment, the second embodiment helps guard against an individual inadvertently switching toggle T and canceling a previously selected security setting.

Figure 10:
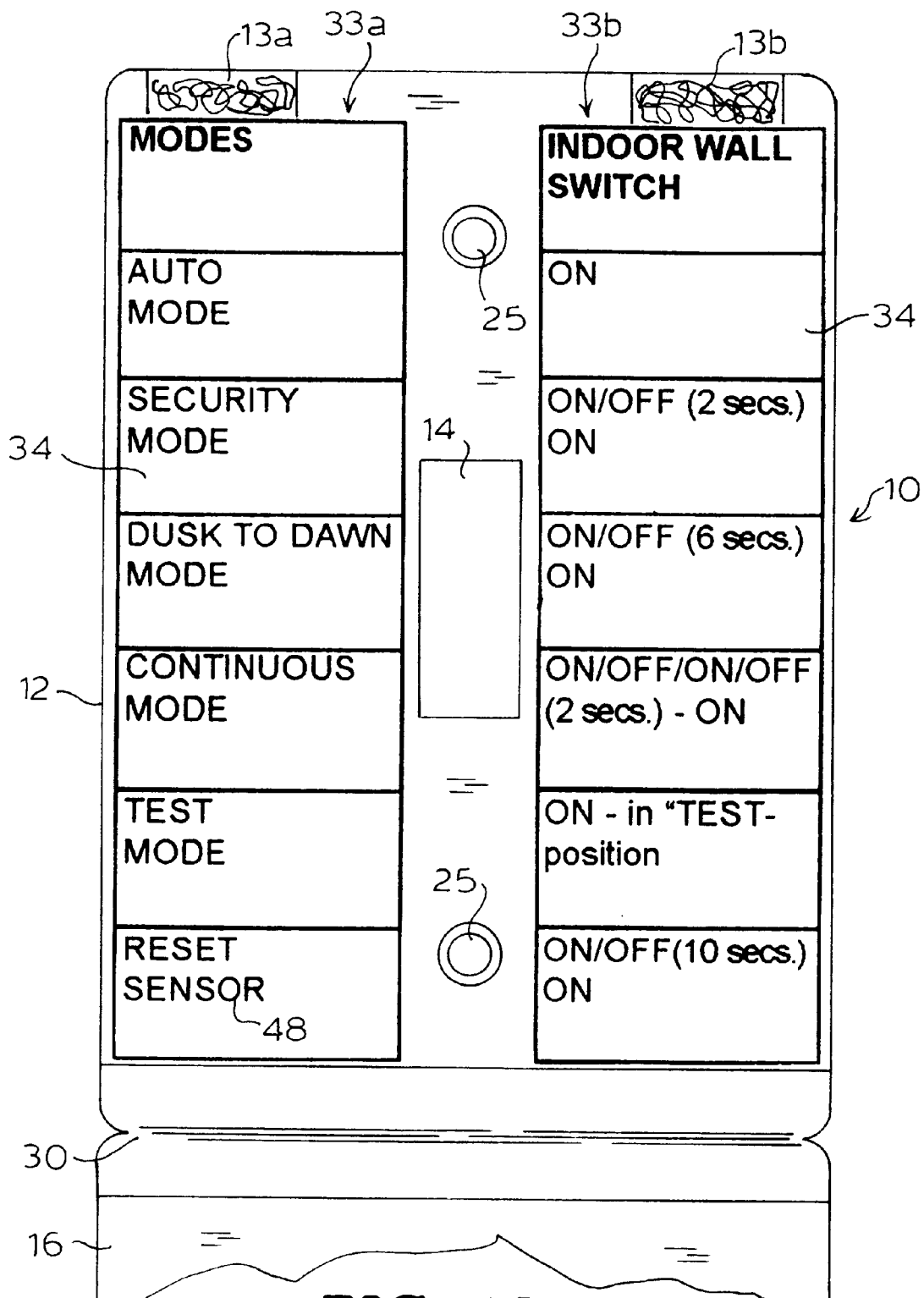
FIG. 10 illustrates a set of instructions attached to the stationary frame of the invention.

Referring now to FIG. 10, protective cover 10 is adapted to receive a set of security light switch instructions 48. Instructions 48 are attached to outside surface 42 of stationary frame 12 in the first embodiment (FIG. 1) and to outside surface 42 of stationary frame 40 of the second embodiment. Instructions 48 may be embossed on outside surfaces 15 or 42 of stationary frame 12 or 42 or may be printed to a card which may glued or otherwise attached to stationary frame 12 or 42. Referring again to FIG. 10, there is shown in more detail columns 33a, 33b, and instructions 48, which may be used for either embodiment of the invention. Instructions 48 are divided by columns 33a, 33b. Columns 33a, 33b are divided into a plurality of uniform blocks 34. Instructions on how to toggle the security switch to set the security light system to a desired mode of operation are provided within uniform blocks 34. Instructions 48 assist users to effectively and correctly set the security Light system to the desired setting.

Although the drawings show a conventional swivel type switch, the protective cover can be designed to work with other style switches. More particularly, rectangular or circular push button toggle or rotary switches can be used. These different style switches would require that the toggle cover and apertures of the present invention be formed to complement the shape of the particular switch.

It is understood that the invention is directed for use with security light systems. However, the present invention could be used for traditional light and appliance switches as well. For example, the toggle switch of the present invention could be used to prevent individuals from inadvertently turning on lights or equipment in certain distant areas of an establishment.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A protective cover adapted to be secured to a cover plate of a wall mounted electrical switch having a toggle comprising:
   a. a stationary rectangular frame attached to a cover plate;
   b. a movable rectangular frame hingedly attached at a lower end thereof to said stationary frame and having an open and closed position;
   c. said stationary rectangular frame adapted to be releasably attachable to said movable rectangular frame; and
   d. a toggle cover attached to said movable frame such that when said movable frame is in said closed position said toggle cover substantially covers a toggle, thereby guarding against inadvertent switching of said toggle.

2. A protective cover as recited in claim 1, wherein said stationary frame includes an outwardly facing surface adapted to receive written instructions.

3. A protective cover as recited in claim 1, further comprising an instruction card attached to said stationary frame.

4. A protective cover adapted to be secured to a cover plate of a wall mounted electrical switch having a toggle comprising:
   a. a stationary frame having an outwardly facing surface and a centrally located stationary frame aperture adapted to receive a toggle therethrough;
   b. a movable frame having an outside and inside surface hingedly attached to said stationary frame, a centrally located movable frame aperture, and open and closed positions, wherein when said movable frame is in said closed position said movable frame aperture receives said toggle therethrough;

c. a hinge interconnecting said stationary frame to said movable frame;

d. means for releasably attaching an unhinged portion of said movable frame to an unhinged portion of said stationary frame; and e. a centrally located toggle cover extending outwardly from the outside surface of said movable frame and above said movable frame aperture, wherein when said movable frame is in said closed position said toggle cover substantially covers said toggle, thereby guarding against inadvertent switching of said toggle.

5. A protective cover as recited in claim 4, wherein said outwardly facing surface of said stationary frame is adapted to receive written instructions.

6. A protective cover as recited in claim 4, further comprising an instruction card attached to said stationary frame.

* * * * *